United States Patent [19]

St. Louis

[11] Patent Number: 4,542,912
[45] Date of Patent: Sep. 24, 1985

[54] TRACTOR FIFTH WHEEL BEARING ATTACHMENT

[75] Inventor: André St. Louis, Quebec, Canada

[73] Assignee: Cham-Co Plastic Industries Inc., Chambly, Canada

[21] Appl. No.: 558,458

[22] Filed: Dec. 6, 1983

[30] Foreign Application Priority Data

Feb. 28, 1983 [CA] Canada .................................. 422499

[51] Int. Cl.⁴ ...................... B62D 53/08; F16C 17/04
[52] U.S. Cl. .................................... 280/433; 384/421
[58] Field of Search ............... 280/433, 434, 435, 608;
384/421, 95; 312/194, 137; 108/27; 308/DIG. 4

[56] References Cited

U.S. PATENT DOCUMENTS

| | | | |
|---|---|---|---|
| 2,508,610 | 5/1950 | Kendall | 280/433 |
| 3,174,812 | 3/1965 | Widmer | 384/421 |
| 3,355,183 | 11/1967 | Kneissl | 280/608 |
| 3,511,523 | 5/1970 | Fuller | 280/433 |
| 3,572,869 | 3/1971 | Studinski | 312/194 |
| 3,704,924 | 12/1972 | Lowry | 384/421 |
| 3,924,909 | 12/1975 | Kent et al. | 384/421 |
| 4,121,853 | 10/1978 | McKay | 280/433 |
| 4,169,635 | 10/1979 | Szalay | 280/433 |

FOREIGN PATENT DOCUMENTS 0058732 9/1982 European Pat. Off. ............ 280/433

Primary Examiner—Joseph F. Peters, Jr.
Assistant Examiner—Everett G. Diederiks, Jr.
Attorney, Agent, or Firm—Larson and Taylor

[57] ABSTRACT

A fifth wheel bearing attachment for mounting on a tractor and avoiding the necessity of providing oil or grease to lubricate the attachment. The improvement to the attachment comprises an antifriction polyolefin plastic sheet covering to fit over a circular fifth wheel metal bearing plate and over two sloped flanges of the fifth wheel attachment. The plastic sheet is attached to the bearing plate and the flanges. Two protective riser bars located on the outside of the two sloped flanges act as protection for the sheet when the tractor is coupled to the trailer.

3 Claims, 3 Drawing Figures

TRACTOR FIFTH WHEEL BEARING ATTACHMENT

This invention relates to a truck mounted attachment for a trailer. More specifically, the invention relates to a fifth wheel bearing attachment on a tractor having an anti-friction bearing sheet thereon.

Fifth wheel bearing attachments between tractors and trailers are used extensively throughout the world. Each tractor has a substantially round flat plate positioned in a horizontal plane to form a bearing surface with two flanges sloped downwards towards the back to enable the tractor to slide underneath the trailer. Each trailer has a king pin extending down to locate the fifth wheel attachement. The trailer has a flat bearing surface on its underside around the king pin to match the bearing surface of the fifth wheel on the tractor.

Lubrication is provided between the bearing surface of the tractor and the bearing surface of the trailer to allow these surfaces to rotate in relationship to one another about the king pin, and this happens continuously when the tractor and trailer assembly are moving on a road. At every corner and every time the front wheels of the tractor are turned, there is a slight rotational movement between these two bearing surfaces of the fifth wheel bearing attachment. It is necessary to always ensure there is sufficient lubrication on this bearing plate, and this is usually achieved by means of pumping grease or other lubricant between the bearing surfaces.

One attempt to improve the lubrication on the bearing surface has been the use of a Teflon* plate attached to the bearing surface on the underside of the trailer so that the Teflon provides lubrication for the fifth wheel unit. Such a plate avoids the necessity of grease or other types of lubricant as the Teflon itself has lubrication properties. It has been found, however, that if the Teflon disc is placed on the trailer, then one requires far more discs because there are more trailers than there are tractors. Teflon is an expensive material and as the trailer can sit for days without moving, the use of this Teflon disc on the trailer is an expensive item.
*Registered Trade Mark Another approach to improve the lubrication on the bearing surface is by the addition of a sheet of high density polyethylene attached to the bearing surface of the tractor. Such a sheet improves the lubrication between the two bearing surfaces of the fifth wheel attachment, but unfortunately, the sheet is often damaged when the tractor is coupled to the trailer because of the impact occurring when the tractor is backed up to the trailer. This impact often rips off the sheet.

An object of the present invention is to provide a fifth wheel attachment assembly wherein an anti-friction high density polyethylene sheet covering is placed on the bearing surface of the tractor fifth wheel attachment, the sheet having sufficient strength to withstand the compression and impact forces between the tractor and trailer when the vehicle is moving and having sufficient lubrication properties to avoid the necessity of providing grease or other lubrication to the fifth wheel attachment, and in addition protective riser bars are attached to the sloped flanges of the tractor fifth wheel to provide protection for the bearing surface during the coupling and uncoupling of the tractor and trailer.

The present invention provides in a fifth wheel attachment assembly on a tractor, for connecting a tractor to a trailer, including a substantially circular fifth wheel metal bearing plate, having a central slot and two sloped flanges for ease of connection to the trailer, the improvement comprising an anti-friction polyolefin plastic sheet covering the bearing plate and the sloped flanges of the fifth wheel attachment and being attached thereto, and including two protective riser bars located one on the outside of each of the two sloped flanges extending to the bearing plate, and having an elevated surface flush with the surface of the sheet and no projections or grooves between the sheet and the two bars to catch when connection between the tractor and the trailer occurs.

In one embodiment of the invention, the sheet is approximately six millimeters thick and formed from extra high molecular weight hexene copolymer. In another embodiment the two protective riser bars are permanently attached to the sloped flanges and the bearing plate by welding, and the sheet is removably attached to the bearing plate and the sloped flanges.

In drawings which illustrate embodiments of the invention,

Figure 1:
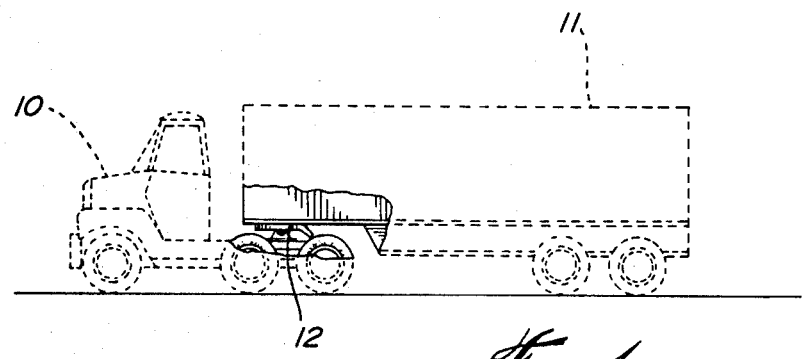
FIG. 1 is a side elevation of a standard tractor trailer rig, as known in the prior art.
Figure 2:
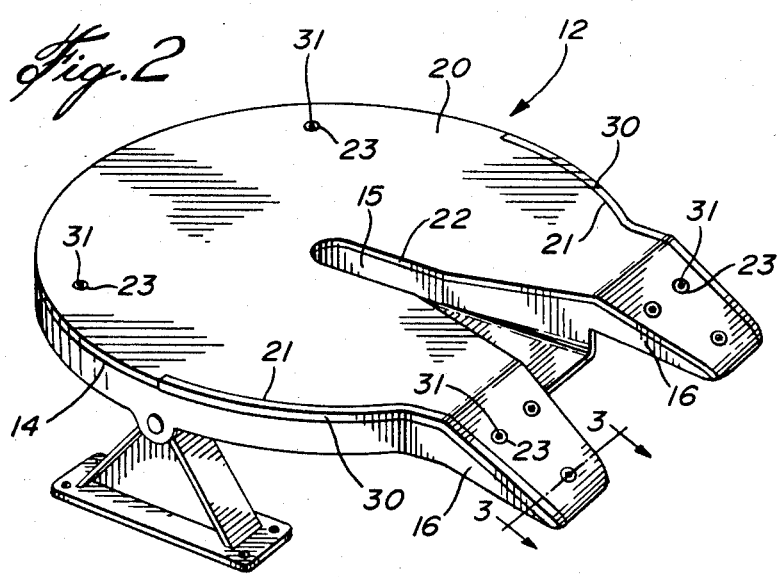
FIG. 2 is an isometric view of a fifth wheel attachment assembly on a tractor with an anti-friction sheet thereon according to the present invention.

Referring now to FIG. 1, a standard tractor 10 is shown attached to a standard trailer 11 by means of a fifth wheel attachment 12. FIG. 2 shows a fifth wheel attachment assembly on a tractor of the type known in the prior art. The tractor assembly has a substantially horizontal metal bearing surface 14 which is substantially round and flat and has a slot 15 extending from the back of the tractor into the centre of the metal bearing surface 14 to take a king pin of a trailer fifth wheel attachment. The slot 15 opens at the back of the tractor and extends downwards forming two flanges 16 which guide the king pin and bearing surface of the trailer fifth wheel attachment onto the bearing surface of the tractor.

A sheet 20 of a polyolefin plastic, preferably high density or ultra high density polyethylene or ethylene copolymer having anti-friction properties is mounted on the bearing surface 14. The sheet is shaped to fit over the metal bearing surface 14 and flanges 16 of the fifth wheel attachment on a tractor. In one embodiment the sheet is approximately six millimeters thick and formed from extra high molecular weight hexene copolymer. The sheet has good stress cracking resistance for all temperatures likely to be encountered in any country of the world inasmuch as the material retains its stress cracking resistance and good rigidity from 160° C. to −100° C. The material has excellent impact strength in this temperature range and a preferred embodiment of the material is sold under the trade mark MARLEX HXM 50100.

The sheet 20 has cut-outs 21 at each side to fit around protective riser bars and a centre cut-out 22 to match the slot 15 in the bearing surface 14 to take the king pin from the trailer. In the embodiment shown, countersunk holes 23 are provided in the sheet 20 at the top and at the bottom of each flange, so that the sheet 20 can be made to firmly stay on the bearing surface 14 and hug the surface of the flanges 16. In another embodiment it is preferred not to drill holes into the bearing surface 14 of the fifth wheel attachment, and a suitable adhesive is provided to hold the sheet 20 on the bearing surface 14.

Figure 3:
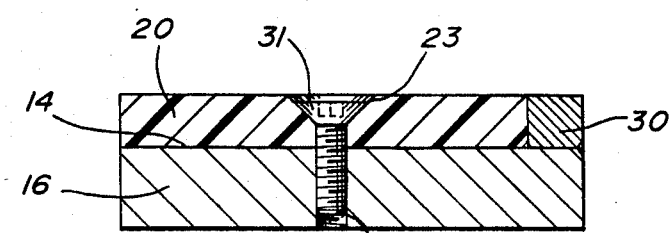
FIG. 3 is a cross sectional view taken at line 3—3 of FIG. 2.

A protective riser bar 30 fits in each of the cut-outs 21 of the sheet 20. Two bars 30 are welded to the outside edges of the flanges 16 of the fifth wheel attachment on the tractor as shown in FIG. 3. The protective riser bars 30 extend for exactly the same height as the thickness of the sheet 20, so that the surface of the bars 30 and the surface of the sheet 20 are the same. The protective riser bars 30 act as protection so that when the tractor backs up to connect to a trailer 11, a sudden impact does not occur on the plastic sheet 20 but is taken by the protective riser bars 30. There are no projections or grooves left at the join between the riser bars 30 and the sheet 20 either on the top surface or at the side, so that even if the tractor is not lined up with the trailer at the time of coupling there are no edges that can catch and be pulled up from the bearing surface 14 or damage the fifth wheel connection. In the embodiment shown, the bars 30 are the same face width on the flanges 16 and on the bearing surface 14. In another embodiment the bars 30 have twice the face width on the flanges 16 as this is where the impact between tractor and trailer initially occurs during coupling. Countersunk screws 31 are shown in the drawing passing through the countersunk holes 23 such that the flat head of the screw 31 is below the surface of the sheet and does not interfere with the anti-friction bearing surface. The screws 31 fit into a drilled and tapped hole 32 in the bearing surface 14 and flanges 16 on the fifth wheel attachment 12. The sheet 20 may be replaced if excessive wear occurs by merely unscrewing the screws 31, prying off the worn sheet 20 and replacing a new sheet. The screws 31 are then replaced to hold the sheet 20 on the fifth wheel attachment 12.

Whereas screws and tapped holes are illustrated in the drawings, in another embodiment these are omitted and a suitable adhesive is supplied to hold the sheet 20 to the bearing surface 14. This avoids holes in the sheet and holes tapped in the metal bearing surface 14 and flanges 16.

The embodiments of the invention in which an exclusive property or privilege is claimed are defined as follows:

1. In a fifth wheel attachment assembly on a tractor for connecting a tractor to a trailer, including a substantially circular fifth wheel metal bearing plate, having a central slot and two sloped flanges for ease of connection to the trailer, the improvement comprising an anti-friction polyolefin plastic sheet forming an upper surface and covering the bearing plate and the sloped flanges of the fifth wheel attachment and being attached thereto, the plastic sheet having cutout portions along a portion of the edges of the bearing plate and along the edges of the sloped flanges, two protective riser bars permanently attached to the sloped flanges and the bearing plate, said riser bars located one on the outside of each of the two sloped flanges and extending along a portion of the bearing plate, said risers fitting within the cutout portions of the plastic sheet and having an elevated surface flush with the surface of the sheet with no projections or grooves between the sheet and the two bars to catch when connection between the tractor and the trailer occurs.

2. The fifth attachment according to claim 1 wherein the sheet is approximately six millimeters thick and formed from exta high molecular weight hexene copolymer.

3. The fifth wheel attachment according to claim 1 and further including means to removably attach the plastic sheet to the bearing plate.

* * * * *